United States Patent [19]

Kessler

[11] Patent Number: 5,117,174
[45] Date of Patent: May 26, 1992

[54] ELECTRIC POWER SYSTEM WITH LINE DROP COMPENSATION

[75] Inventor: Leland L. Kessler, American Township, Allen County, Ohio

[73] Assignee: Westinghouse Electric Corp., Pittsburgh, Pa.

[21] Appl. No.: 416,565

[22] Filed: Oct. 3, 1989

[51] Int. Cl.⁵ .................................................. H02P 9/00
[52] U.S. Cl. ........................................ 322/21; 322/28; 322/59
[58] Field of Search ..................... 322/21, 23, 24, 25, 322/28, 59, 73, 99

[56] References Cited

U.S. PATENT DOCUMENTS

| | | | |
|---|---|---|---|
| 3,634,750 | 1/1972 | Bono | 322/24 X |
| 3,652,920 | 3/1972 | South et al. | 322/24 X |
| 4,446,417 | 5/1984 | Fox et al. | 322/25 |
| 4,554,501 | 11/1985 | Baker | 322/90 X |
| 4,807,106 | 2/1989 | Baker et al. | 322/59 X |
| 4,839,576 | 6/1989 | Kaneyuki et al. | 322/28 X |
| 4,841,216 | 6/1989 | Okada et al. | 322/29 X |

Primary Examiner—Steven L. Stephan
Assistant Examiner—Kristine Peckman
Attorney, Agent, or Firm—R. P. Lenart

[57] ABSTRACT

An electric power system having line drop compensation includes a controllable electric power source having an output for supplying voltage to a power bus, a local voltage regulator for monitoring the output voltage of the power source and for producing a control signal representative of a desired nominal output voltage of the power source, and a remote voltage regulator for sensing voltage on the power bus at a point of regulation located away from the power source. The remote voltage regulator produces a pulse width modulated signal having a duty cycle representative of the voltage at the point of regulation. A pulse width to trim bias converter receives the pulse width modulated signal and produces the trim signal having a magnitude representative of the duty cycle of the pulse width modulated signal. This trim signal is combined with the control signal of the local voltage regulator to produce a modified control signal for controlling the output voltage of the power source to produce a predetermined voltage at the point of regulation.

8 Claims, 2 Drawing Sheets

ELECTRIC POWER SYSTEM WITH LINE DROP COMPENSATION

BACKGROUND OF THE INVENTION

This invention relates generally to voltage regulation in electric power systems and, more particularly, to electric power systems which compensate for voltage drops in power conductors.

Constant speed drive electrical power systems which are typically found on commercial aircraft, couple an electric generator to the aircraft engine through a hydromechanical transmission which drives the generator at a constant speed to produce constant frequency output voltage. Variable speed constant frequency (VSCF) power systems include a generator which is directly coupled to the engine and therefore driven at variable speeds. The variable frequency output of this generator is electronically converted to a constant frequency output. It is desirable to retrofit existing constant speed drive equipped aircraft with variable speed constant frequency power systems. A key to successful retrofit lies in the design of a VSCF system which is directly interchangeable with the existing CSD system. This precludes aircraft wiring changes or changes in any of the other system components. To accomplish this objective, the VSCF converter and its controls must be in the same package as the generator.

The VSCF converter and associated controls would be mounted adjacent to the aircraft engine. A multiple phase power bus connects the engine mounted VSCF system to the aircraft loads. The VSCF voltage regulator senses the voltage at the output terminals of the VSCF system. Thus, the voltage received at the load end of the power bus is dependent upon load current and feeder impedance. This results in unsatisfactory voltage regulation at the load terminals.

One approach which has been used to compensate for line voltage drop is to develop a signal proportional to load current which is injected into the VSCF voltage regulation loop. This approach is unsatisfactory for aircraft systems because it is dependent upon feeder length, changes in feeder impedance because of temperature extremes, and changes in impedance because of feeder spacing from each other and the skin of the aircraft. Furthermore, the feeder voltage drop is dependent upon the power factor of the load.

It is therefore desirable to devise an electric power system having line drop compensation which is independent of feeder length, feeder impedance, load current and power factor.

SUMMARY OF THE INVENTION

Electric power systems having line drop compensation constructed in accordance with this invention include a controllable electric power source having an output for supplying a power bus, a local voltage regulator for monitoring the output voltage of the power source and for producing a control signal representative of a desired nominal output voltage in the power source, and a remote voltage regulator for sensing the voltage on the power bus at a point of regulation located away from the power source. The remote voltage regulator produces a pulse width modulated signal having a duty cycle representative of the voltage at the point of regulation. A pulse width to trim bias converter receives the pulse width modulated signal and produces a trim signal having a magnitude representative of the duty cycle of the pulse width modulated signal. The trim signal is combined with the control signal to produce a modified control signal for controlling the output voltage of the power source to produce a predetermined voltage at the point of regulation.

BRIEF DESCRIPTION OF THE DRAWINGS

The invention will become more readily apparent from the following description of the preferred embodiment thereof, shown by way of example only, in the accompanying drawings, wherein.

DESCRIPTION OF THE PREFERRED EMBODIMENT

Figure 1:
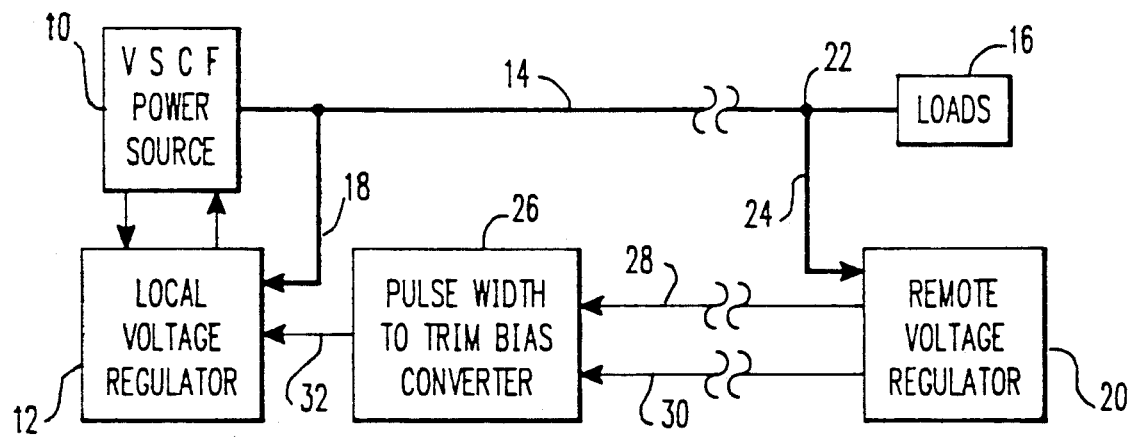
FIG. 1 is a block diagram of an electric power system constructed in accordance with the present invention.

Referring to the drawings, FIG. 1 is a block diagram of an electric power system constructed in accordance with the present invention. A controllable electric power source in the form of a VSCF power converter 10 is mounted adjacent to an aircraft engine along with an associated local voltage regulator 12. The power source supplies power by way of a multiple phase power bus 14 to one or more loads illustrated by block 16. The local voltage regulator 12 senses the output voltage of the VSCF power source by way of sensing lines 18 and produces a control signal representative of a desired nominal output voltage of the power source in accordance with known techniques. A remote voltage regulator 20 senses the power bus voltage at a point of regulation 22 via lines 24. In existing constant speed drive systems, this remote voltage regulator is used to supply a pulse width modulated current to the exciter field winding of an engine mounted generator. If a higher voltage is required, the duty cycle of the field current pulse width modulated signal increases. The present invention uses the existing remote voltage regulator to supply the pulse width modulated signal having a duty cycle representative of the voltage at the point of regulation, to a pulse width to trim bias converter 26 by way of lines 28 and 30. The pulse width to trim bias converter receives the pulse width modulated signal and produces a trim signal (on line 32) having a magnitude representative of the duty cycle of the pulse width modulated signal. This trim signal is combined with the control signal in the local voltage regulator to produce a modified control signal for controlling the output voltage of the power source to produce a predetermined voltage at the point of regulation.

Figure 2:
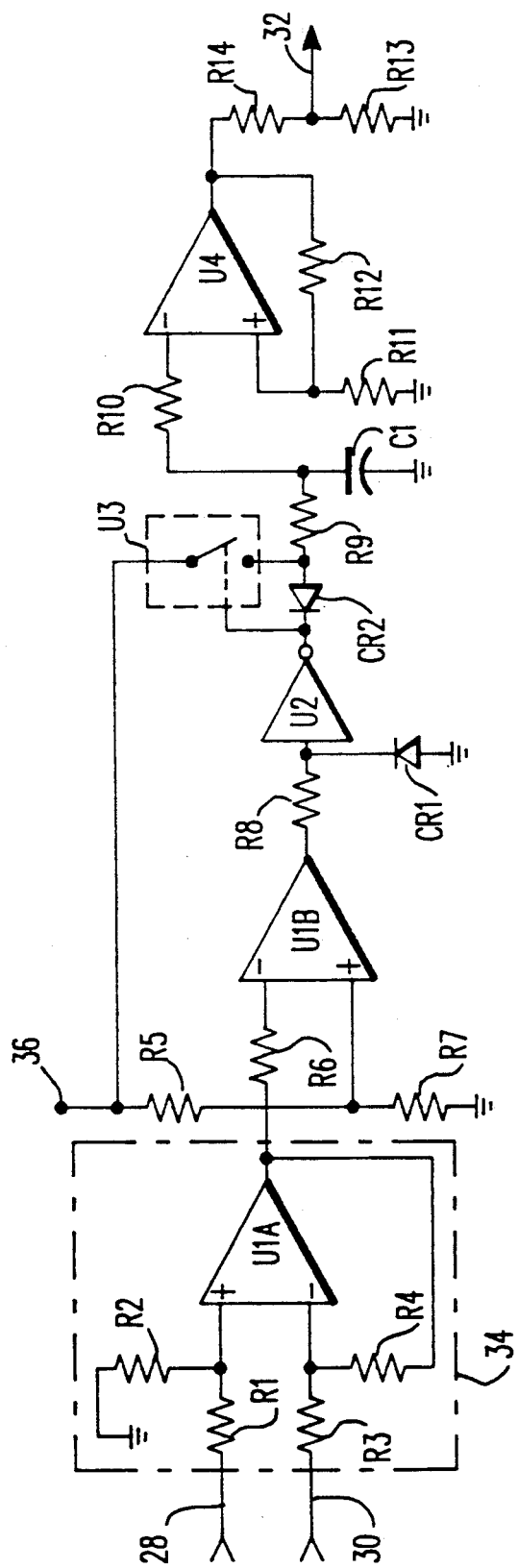
FIG. 2. is a schematic diagram of the pulse width to trim bias converter of the system of FIG. 1.

FIG. 2 is a schematic diagram of one embodiment of a pulse width to trim bias converter which may be used in the circuit of FIG. 1. The pulse width modulated signal on lines 28 and 30 is connected to the inputs of operational amplifier U1A in a differential amplifier circuit 34 which also includes resistors R1, R2, R3 and R4. The output of this differential amplifier is connected to the inverting input of operational amplifier U1B. A voltage signal, which may be for example 10 volts DC, is supplied to terminal 36 and divided by resistors R5 and R7 to produce a reference voltage signal at the non-inverting input of amplifier U1B. Amplifier U1B acts as a comparator to set the threshold of the circuit.

The output of U1B is inverted by inverter U2. Diode CR1 limits the amount of negative voltage that can be applied to the input of U2. The output of U2 drives an analog switch U3. When the output of U2 is high, capacitor C1 is charged by the voltage at terminal 36 through resistor R9. When the output of capacitor U2 is low, the capacitor discharges through R9 and diode CR2. Thus the capacitor voltage is inversely proportional to the duty cycle of the pulse width modulated signal. Since inverter U2 inverts the signal, the capacitor will charge to the voltage at terminal 36 when the duty cycle is zero and to near zero volts when the duty cycle is 100%.

Operational amplifier U4 isolates the capacitor from the output. In the preferred embodiment, an LM124 amplifier was chosen because it has the ability to pull down the negative rail. Resistors R1 and R12 set the gain of amplifier U4. In the preferred embodiment, the gain of amplifier U4 is set so that a 10 volt capacitor voltage results in an 11.4 volt output. Resistors R13 and R14 are used to set the trim bias signal on line 32 to the desired level. The voltage across R13 varies linearly from a first predetermined level down to a second predetermined level as the duty cycle of the input pulse width modulated signal goes from 0 to 100%.

Figure 3:
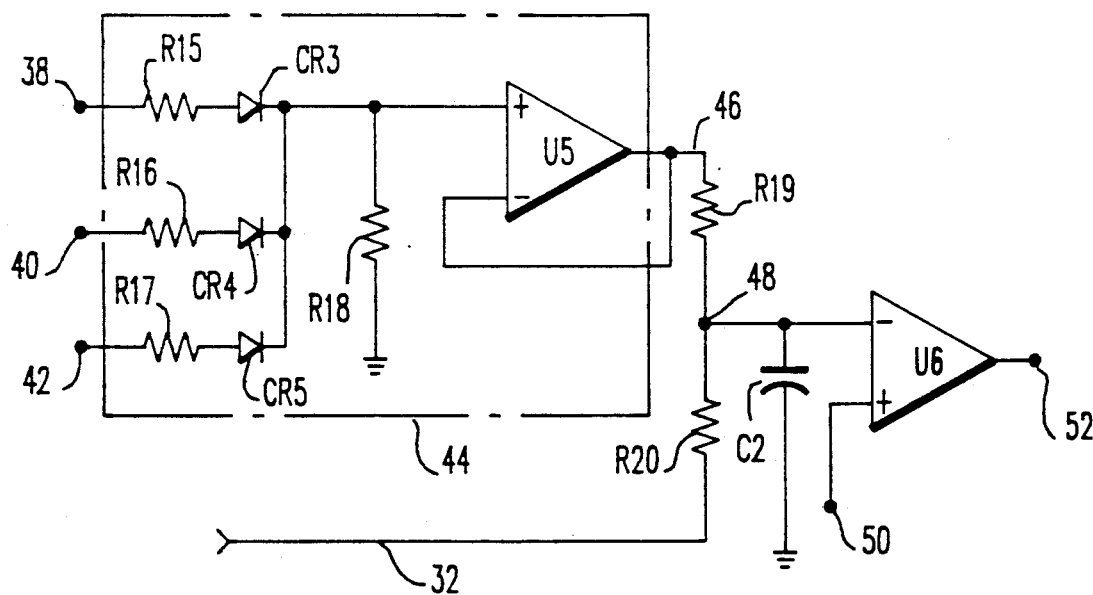
FIG. 3. is a schematic diagram which illustrates the technique of injecting the trim bias voltage signal into the local voltage regulator of the system of FIG. 1.

FIG. 3 is a schematic diagram of a circuit used to inject the trim bias voltage signal on line 32 into the control circuit of the local voltage regulator 12 in FIG. 1. Terminals 38, 40 and 42 receive voltages which are indicative of the output voltage of the VSCF power source on the multiple phase power bus. A peaking circuit 44 comprising resistors R15, R16, R17 and R18, diodes CR3, CR4 and CR5, and amplifier U5 produces an output on line 46 which is representative of the highest voltage input level. This signal is applied to one end of a voltage divider comprising resistors R19 and R20, while the other end of the voltage divider is connected to receive the trim bias voltage signal on line 32. The voltage signal at point 48 is then compared to a reference voltage signal supplied on terminal 50 by a comparator U6 to produce a modified control signal at terminal 52. The modified control signal is then used in accordance with known techniques to control the output voltage of the power source thereby producing a predetermined voltage at the point of regulation in the power system.

The circuit of FIG. 2 is constructed for a system where the negative terminal of the generator field is at ground potential. Most systems have the negative side of a switching transistor in the remote voltage regulator at ground potential. Since the voltage across the switching transistor is minimum when the current through the field is maximum, a change in polarity of the circuit shown in FIG. 2 would be required. This can be accomplished by changing U2 from an inverter to a non-inverting buffer.

The pulse width to trim bias converter circuit should have limited authority. That is, the range of the trim bias signal must be limited to that required for the worst case line impedance and the worst case load condition. When the system is unloaded, the voltage at the VSCF power source terminals equals the voltage at the point of regulation. At no load, the duty cycle of the pulse width modulated signal produced by the remote voltage regulator is set at a predetermined level, for example, 30%. As the duty cycle increases from say 30 to 100%, a trim bias circuit must increase the voltage at the VSCF terminals to maintain the desired voltage level at the point of regulation. Except during transients, the pulse width modulated signal duty cycle should remain in the 30 to 100% range. It will go to a lower duty cycle during transients. These transients occur during build-up and load removal. Build-up is defined as that period of time during which the system is commanded to go from zero voltage output (field switch closed) to its steady state voltage. As the voltage increases towards its desired steady state voltage, the time constants of the closed loop system are not fast enough to lower excitation at the instant that the steady state voltage is reached. Consequently, the output voltage exceeds or overshoots the desired steady state value. Thus the remote voltage regulator senses too high a voltage, and reduces the duty cycle to zero percent. In a short time (dependent on system time constants), the system recovers to its steady state value and the remote voltage regulator reverts to the 30 to 100% range.

Load removal transients occur when the load is removed. While the system is supplying the load, the duty cycle increases towards 100% duty cycle. At the instant the load is removed, the excitation level is such that the system will go to a higher value (overshoots). During the time that it takes the system to recover to its steady state value, the remote voltage regulator senses that the voltage is too high and reduces the duty cycle to zero percent.

With two voltage regulators in a closed loop system, there is a possibility of stability or modulation problems. In the preferred embodiment of this invention, the problem is prevented by making the response time of the trim bias circuit slow with respect to the response time of the local voltage regulator. Since on a buildup transient, the trim bias voltage is set to drop only to an extent such that the output voltage of the VSCF power source is decreased by less than, for example, 5%, the time that it takes for the system to recover to its desired nominal output voltage is much less critical than it would have been if the range of the trim bias circuit was not limited and the trim bias would have depressed the output voltage of the VSCF power source to zero.

The trim bias circuit must be independent of the magnitude of the pulse width modulated signal and sensitive only to its duty cycle. In addition, because of the distance between the local and the remote voltage regulators, the pulse width modulated signal must be sensed differentially so that common mode voltages will not affect its performance.

Although the present invention has been described in terms of what is at present believed to be its preferred embodiment, it will be apparent to those skilled in the art that various changes may be made without departing from the scope of the invention. It is therefore intended that the appended claims cover such changes.

What is claimed is:

1. An electric power system having line drop compensation, said system comprising:
  a controllable electric power source having an output for supplying voltage to a power bus;
  a local voltage regulator for monitoring the output voltage of said power source and for producing a control signal representative of a desired nominal output voltage of said power source;
  a remote voltage regulator for sensing voltage on said power bus at a point of regulation located away from said power source, and for producing a pulse width modulated signal having a duty cycle representative of the voltage at said point of regulation;

a pulse width to trim bias converter for receiving said pulse width modulated signal and for producing a trim signal having a magnitude representative of the duty cycle of said pulse width modulated signal; and means for combining said control signal with said trim signal to produce a modified control signal for controlling the output voltage of said power source to produce a predetermined voltage at said point of regulation.

2. An electric power system as recited in claim 1, wherein:

the response time of said trim bias converter is greater than the response time of said local voltage regulator.

3. An electric power system as recited in claim 1, wherein:

said trim signal is independent of the magnitude of said pulse width modulated signal.

4. An electric power system as recited in claim 1, wherein:

the duty cycle of said pulse width modulated signal is about 30% when said power bus is not loaded.

5. An electric power system as recited in claim 1, wherein said pulse width to trim bias converter comprises:

a differential amplifier for receiving said pulse width modulated signal, and for producing an amplified pulse width modulated signal;

means for comparing said amplified pulsed width signal with a reference signal;

means for charging a capacitor when said amplified pulse width signal exceeds said reference signal; and means for producing said trim bias signal in response to the voltage on said capacitor.

6. A method of line drop compensation in an electric power system, said method comprising the steps of:

providing a controllable electric power source;

connecting said controllable power source to a power bus;

producing a control signal representative of a desired nominal output voltage of said power source;

sensing voltage on said power bus at a point of regulation located away from said power source;

producing a pulse width modulated signal having a duty cycle representative of the voltage at said point of regulation;

producing a trim signal having a magnitude representative of the duty cycle of said pulse width modulated signal; and combining said control signal with said trim signal to produce a modified control signal for controlling the output voltage of said power source to produce a predetermined voltage at said point of regulation.

7. A method of line drop compensation, as recited in claim 6, wherein:

said trim signal is independent of the magnitude of said pulse width modulated signal.

8. A method of line drop compensation, as recited in claim 6, wherein:

the duty cycle of said pulse width modulated signal is about 30% when said power bus is not loaded.

* * * * *